Dec. 24, 1940.            H. BAER            2,225,939
CLUTCH MECHANISM
Original Filed Nov. 23, 1934    2 Sheets-Sheet 2
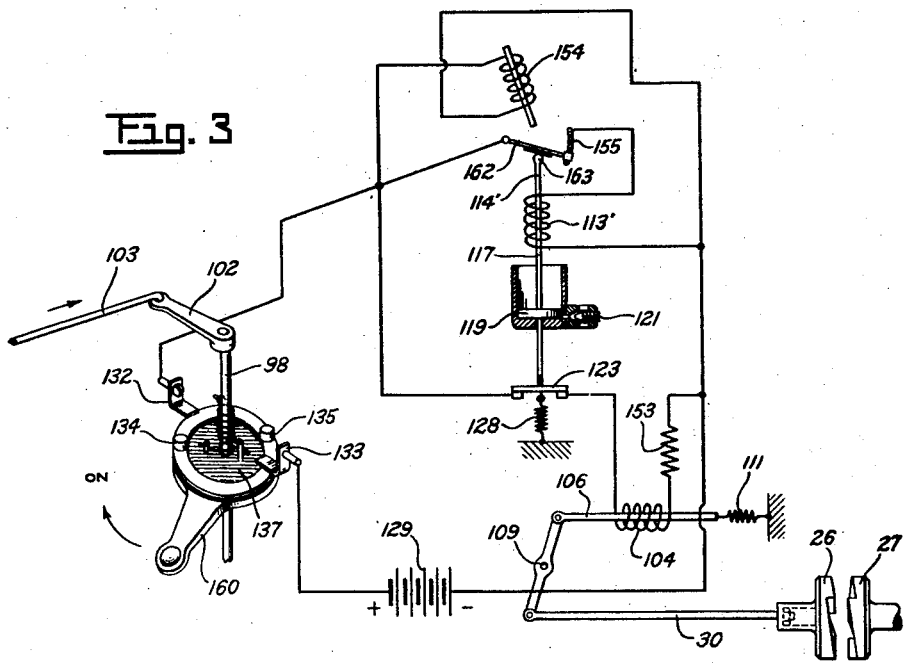
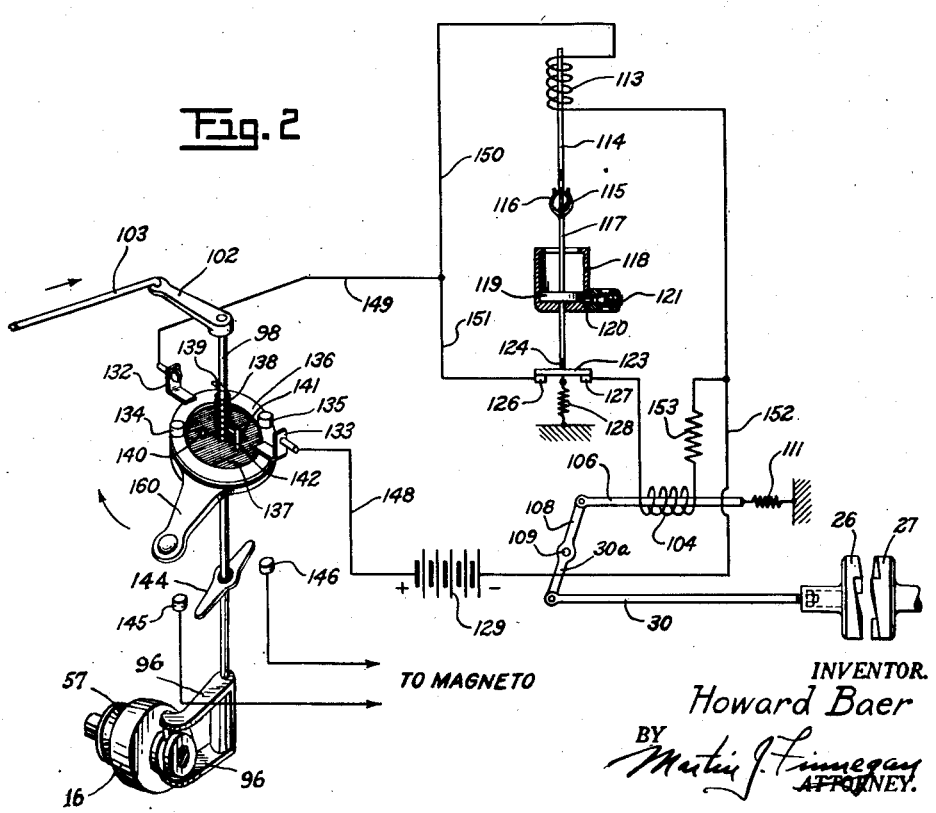
INVENTOR.
Howard Baer
BY Martin J. Finnegan
ATTORNEY.

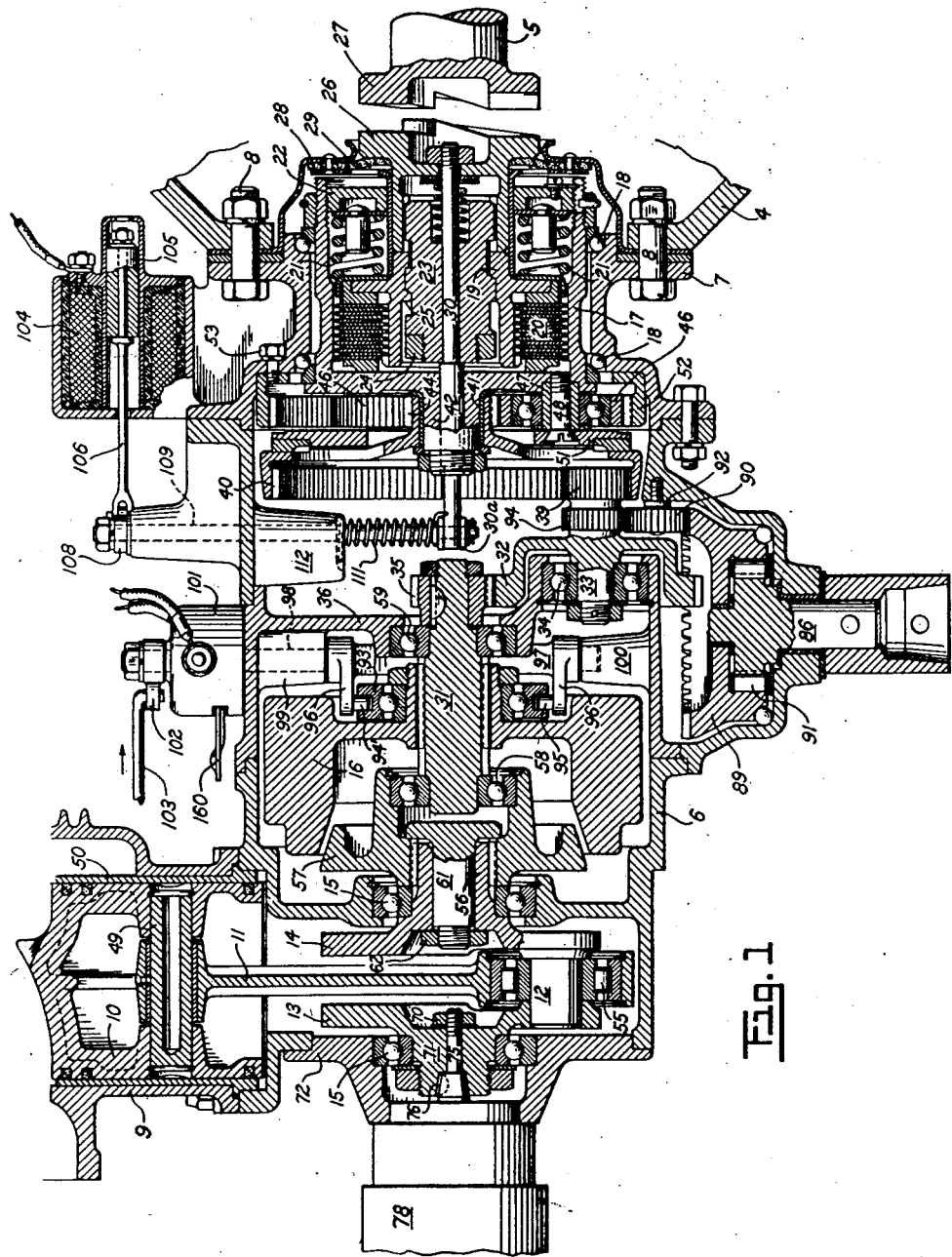

Patented Dec. 24, 1940

2,225,939

UNITED STATES PATENT OFFICE 2,225,939

CLUTCH MECHANISM

Howard Baer, Jersey City, N. J., assignor to Eclipse Aviation Corporation, East Orange, N. J., a corporation of New Jersey Original application November 23, 1934, Serial No. 754,531. Divided and this application September 29, 1937, Serial No. 166,425

7 Claims. (Cl. 192—48)

This invention relates to clutch mechanism, and particularly to the operation of a plurality of clutch elements in a predetermined time relationship.

The object is to provide improved mechanism adapted for the indicated purpose, together with improvements in parts adapted for use in such mechanism.

One embodiment of the present invention is illustrated in the accompanying drawings, wherein like reference characters indicate like parts throughout the several views; it being expressly understood that the drawings are for purposes of illustration only and are not designed as a definition of the limits of the invention, reference being had for this purpose to the appended claims.

In the drawings:

Fig. 1 is a view in elevation of the embodiment above referred to;

Fig. 2 is a diagram of the electrical circuits and parts involved in the control of certain component parts of the complete unit of Fig. 1; and Fig. 3 is a diagram of a somewhat different arrangement of control circuits and parts.

Referring more particularly to Figs. 1 and 2, the mechanism constituting the subject matter of the present invention when applied to the duty of starting a pair of internal combustion engines in sequence, may be mounted as a unit on the crank-case of the first engine, a portion of said crank-case being shown at 4, and is adapted to be drivably connected to a rotating member of the second engine to be started, such as the crank-shaft, a portion of the latter being illustrated at 5. The mechanism proper is constituted by a unitary structure enclosed in a sectional housing 6 which is substantially cylindrical in outline. One end of the housing is provided with a flange 7 having openings to receive bolts 8 whereby housing 6 may be connected to the crank-case 4.

The upper portion of housing 6 includes a cylinder 9 in which is mounted a piston 10. The piston is drivably connected through a suitable connecting rod 11 to a crank-pin 12 having crank-cheeks 13 and 14 which are rotatably mounted on ball bearing assemblies 15 within the housing 6. A flywheel 16 is brought into operative connection (by means hereinafter described) with crank 14 and also with a barrel 17 which is rotatably mounted as by means of ball bearings 18 in the forward end of housing 6. An interiorly threaded nut or sleeve 19 is concentrically disposed within barrel 17 and is drivably connected to said barrel by means of a plurality of friction discs 20. A plurality of coil springs 21 are provided to maintain discs 20 in frictional engagement, and a locking ring 22 is preferably threaded into the inner end of the barrel to vary the pressure exerted by said springs on the discs.

Mounted for rotary and longitudinal movement within sleeve 19 is a threaded shaft 23 to the inner end of which is secured a nut 24 adapted to engage an annular shoulder 25 provided within said sleeve. The outer end of shaft 23 carries a jaw clutch member 26 adapted to drivably engage a jaw clutch member 27 secured to or integral with engine member 5.

Means including a metal cup-shaped member 28 and a flexible washer 29 are preferably associated with the inner end of the barrel structure to prevent oil from seeping into the housing 6 from the engine crank-case. In the form shown, a rod 30 slidably extends through barrel 17 and shaft 23 to transmit an axial thrust to shaft 23 and thereby cause jaw 26 to engage jaw 27, and the inner end of rod 30 connects with a shifter fork 30a corresponding to the shifter fork of the conventional inertia starter such as that shown in greater detail in Lansing Patent No. 1,833,948, wherein a similar shifter fork is designated by reference character 102.

In the form shown, the flywheel 16 has a hub slidably engaged with a shaft 31 which in turn receives a pinion 35 that meshes with a gear 32 which is rotatably mounted by means of a stub shaft 33, preferably formed integrally therewith, in ball bearing 34 carried by a boss formed on the transverse wall or diaphragm 36. The outer end of shaft 33 is provided with gear teeth constituting a pinion 39 that meshes with an internal ring gear 40, the hub 41 of which is rotatably mounted on an extension 42 of a barrel member 17. The hub 41 of ring gear 40 is provided with gear teeth and constitutes a pinion or sun gear 44 that meshes with a plurality of planetary gears, one of which is shown in elevation at 46, said planetary gears preferably being three in number and being rotatably mounted on the barrel 17 in any suitable manner, as by means of bushings 47 surrounding screws 48 threaded into said barrel member. A retaining ring 51 secured by the screws 48 retains the planetary gears on the bushings 47, and an internal ring gear 52 that is secured to the casing by means of screws 53 surrounds and meshes with said planetary gears.

The rotation of flywheel 16 is thus transmitted through a reduction gear train constituted by pinion 35, gears 32, 39, 40, 44, 46 and 52 to the barrel 17. The rotation of barrel 17 is in turn transmitted to the jaw 26 through the friction clutch discs 20 above described, and the shaft 23.

In the form shown, the internal combustion engine comprises the usual cylinder 9 and liner 50 in which reciprocates the piston 10 having a wrist-pin 49 to which is pivoted the connecting rod 11. The end of the connecting rod 11 is rotatably mounted on crank-pin 12 by means of a suitable roller bearing 55, the pin 12 being shown as integral with crank-arm 14, the hub 56 of which is drivably connected to the hub of a friction clutch 57 and secured on said hub 56 by a bolt 61 and nut 62. Hub 56 and clutch 57 are rotatably mounted by means of ball bearings 15 and 58, the latter also constituting a supporting bearing for one end of shaft 31, while a third bearing 59 rotatably supports the opposite end of shaft 31, and transverse wall 36 maintains these parts in proper assembled relation. The other crank hub 71 is mounted in a second ball bearing 15 supported in a recess formed in one of the casing sections 72, and a retaining nut 70 is threaded on the inner end of the shaft 75 driven by the hub 71 through the driving connection shown at 76. Magneto 78, being driven by shaft 75, rotates at engine speed, and supplies spark to the ignition plug (not shown) of cylinder 9.

For initially energizing the flywheel 16, a hand crank or other prime mover is used to rotate shaft 86 and gear 89 through an overrunning clutch 91 having the inner race integral with the shaft 86 and the outer race forming part of gear 89. The reason for this clutch is to prevent the shaft 86 from rotating while the engine is running. Gear 89 drives pinions 90 and 94, the latter being formed on shaft 33, and the former being adapted to run as an idler about the supporting stud 92.

From the foregoing description it will be apparent that the connections 86, 89, 90, 94, 32, 35 and 31 provide a means for storing energy into the flywheel 16 prior to connection of the flywheel with the engine crankshaft 12, such connection being subsequently established through operation of the flywheel shifting means which, as shown, is constituted by a ball bearing thrust member or collar 93 which is peripherally grooved to receive pins 94' and 95 extending from the arms 96 of shifter yoke 97, the latter being adapted to oscillate with the actuating pin or rockshaft 98 journaled in the bearings or bosses 99 and 100, extending inwardly from opposite sides in the housing 6. As shown in both Figs. 1 and 2, this actuating shaft 98 passes through a switch assembly enclosed in a casing 101 and at its upper end it receives an arm 102 and link 103 constituting the manually operable means for actuating the shifter yoke 97 and at the same time exercising an indirect control over the energization of the ignition circuit for the engine 9 and also the energization of the means for operating the clutch actuating members 30 and 30a which cause a meshing of the engine engaging clutch member 26 with the engine clutch member 27.

As shown in Figs. 1 and 2 the last named clutch operating means includes a solenoid having a winding 104 surrounding a magnetizable core 105 and the rod 106 connected thereto at one end, the opposite end of the rod being pivotally connected to an arm 108 which is adapted to swing about the axis of the rock-shaft 109, the upper end of which operatively engages said arm 108 and the lower end of which operatively engages the shifter yoke 30a, the said parts 109 and 30a being normally held in the clutch disengaging position by the action of a coiled torsion spring 111, one end of which abuts the rod 30 and the opposite end of which abuts the housing boss 112, the construction and operation of these last named parts being identical with that of the corresponding parts shown in the Lansing Patent No. 1,833,948 above referred to.

Instead of the direct energization of the winding 104, which is shown in the aforesaid Lansing patent, the present invention involves an indirect and selectively delayed energization so as to establish a definite time sequence as between the operation of the flywheel shifting means and the means for engaging the clutch elements 26 and 27, such time interval being so adjusted as to insure the starting of the engine 9 and the consequent re-acceleration of the flywheel 16 prior to the establishment of driving connection between said flywheel and the crankshaft 5 of the main engine.

Two constructions for effecting this predetermined sequence of operation are disclosed in the drawings, one being shown diagrammatically in Fig. 2, and the second in Fig. 3. Referring first to Fig. 2, the sequence control means includes a second solenoid 113 having a magnetizable plunger 114 insulated from but mechanically connected with a spherical member 115 loosely held by resilient fingers 116 projecting from the end of a rod 117 which passes through a dashpot 118 having the usual plunger 119 and restricted vent 120, the degree of restriction and hence the time constant of the dash-pot being regulable through manipulation of an adjusting screw 121. At the lower end rod 117 connects with a current conducting member 123 from which it is insulated as indicated at 124, the said member 123 being normally held in engagement with parts 126 and 127 by the action of the switch closing spring 128 or by virtue of the weight of the parts 119, 117 and 123. As shown, parts 126 and 127 are parts of the circuit from the current source 129 from which both the solenoids 113 and 104 are adapted to receive their energization, the circuit including also the switch previously referred to as mounted in the casing 101. The latter switch includes a pair of stationary contact elements or terminals 132 and 133 adapted to be engaged by pins 134 and 135 respectively, the said pins being integral parts of the current conducting rim 136 of a disc 137 normally held in the open circuit position by the action of a torsion spring 138 coiled about the previously described rock shaft 98 and having one end fastened thereto as indicated at 139, and the opposite end abutting a fixed pin 140. An operative connection between the rock-shaft 98 and the switch ring 136 preferably takes the form of a pin 141, projecting from the said shaft 98 and adapted to bear against a second pin 142 secured to the central, or non-conducting part of the disc 137, whereby movement of the rock-shaft for the previously described purpose of shifting flywheel 16 into engagement with clutch element 57, also operates to bring contacts 134 and 135 into engagement with terminals 132 and 133 respectively, and at the same time, incidentally, causes the switch element 144 to swing into engagement with terminals 145 and 146 of the circuit from the magneto 78 to the ignition plug of the engine 9, such swinging of the shaft 98 being in opposition to the tendency of the spring 138 and being brought about (as previously suggested) by actuation of the operator's link 103.

Preferably those parts that have been described as "fixed" or "stationary," and this includes parts 140, 132 and 133, are rigidly supported by housing 101 (Fig. 1) as are also the magneto circuit terminals 145 and 146.

The circuit closing action just described results in passage of current to both the solenoid 113 and the solenoid 104 through the connections indicated at 148, 149, 150, 151 and 152; but due to the inclusion of a resistance element 153 in the portion of the circuit passing through the winding 104, there is a time delay in the building-up of an effective current in this branch of the circuit, due to the inductance of the coil 153. For this reason, as well as for the additional reason that the added resistance of the coil 153 cuts down the amount of current drawn by this branch of the circuit as compared to the greater current draw of the lower resistance branch of the circuit which passes through the solenoid 113, the solenoid 113 is more readily effective to create a magnetic field sufficiently strong to raise the plungers 114 and 117 against the opposition of spring 128, thereby breaking the circuit to the solenoid 104 (at the point 123) prior to development of any appreciable magnetic field therein. As a result of this break at 123, the actuation of plunger 106 is delayed pending the completion of the following actions:

First, the raising of the plunger rods 114 and 117 to the point which brings the plunger 119 into abutment with the upper rim of the dashpot 118;

Secondly, the release of the ball 115 from the fingers 116 due to the continued energization of the winding 113 and the resultant continued upward pull upon the rod 114 while the plunger rod 117 remains held with the plunger 119;

Thirdly, the descent of the plunger 119, now that the ball has released itself, such descent being retarded by a predetermined amount according to the setting of the vent controlling screw 121;

Fourth, the return of the contact 123 to the circuit closing position indicated (as the plunger 119 completes its downward stroke) and energization of the solenoid 104 by virtue of such closing of the switch 123.

The energization of the solenoid 104 is now effective to draw the plunger 105 to the left as viewed in Fig. 1 and through the previously described connections 106, 108, 109, 30a, and 30, the clutch member 26 has moved into mesh with the engine member 27 and is immediately effective to transmit to said engine member the energy which has been by this time stored in sufficient amount in the flywheel 16, it being understood that the latter has remained drivably connected with the accelerating engine 10 during the time interval of delay in the actuation of the solenoid 104. The delivery of this stored energy to the engine member 5 and the resultant starting of the latter under its own power, is of course, the signal for the operator to release the rod 103 thereby permitting spring 138 to return switch contacts 134, 135 and 144 to the open circuit positions indicated in Fig. 2 thereby de-energizing both solenoids 113 and 104 and permitting spring 111 to return the elements 30a, 109, 108 and 106 to the normal inoperable positions shown in Fig. 1, such return being concurrent with the starting of the engine under its own power and the resultant return of the rod 30 and the clutch element 26 to the demeshed positions due to the overrunning action of the threads on shaft 23.

The de-energization of the solenoid 113 brought about by the breaking of the circuit at 134, 135 permits the ball 115 to return by gravity into the socket 116 thus restoring the time delay mechanism to the normal position. Also the flywheel 16 is returned to the normal position, that is the disengaged position indicated in Fig. 1 by the action of the spring 138 upon rock-shaft 98 and yoke 96 as soon as the operator has released the rod 103.

In place of the time delay mechanism shown in Fig. 2 there may be substituted the arrangement shown in Fig. 3 which differs from that of Fig. 2 principally in the addition of a third solenoid 154 and armature 162 adapted to be attracted upon energization of the solenoid 154 and also adapted to be mechanically actuated by an extension 163 of the plunger 114′, the latter corresponding to the plunger 114 of Fig. 2. As shown, the armature 162 has sliding contact with a segment 155 constituting part of the circuit to the solenoid 113′, the latter corresponding to the solenoid 113 of Fig. 2. All other parts shown in Fig. 3 are designated by reference characters similar to those designating the corresponding parts in Fig. 2.

The operation of the time delay mechanism of Fig. 3 is as follows:

Upon closure of the switch 134, 135 current flows simultaneously through the windings 154, 113′ and 104 but the latter, just as in the arrangement of Fig. 2, fails to build up a sufficiently strong magnetic field prior to stoppage of the current flow by virtue of the opening of the circuit thereto at the point 123. Meanwhile, armature 162 and plunger rod 117 continue their upward movement until the armature passes off the segment 155 and thereby de-energizes the coil 113′. This de-energization of the coil 113′ permits the plunger 119 to begin its descent at the restricted rate permitted by the adjustment 121 and results finally in the re-closing of the switch 123 and the energization of the solenoid 104, from which point the operation is exactly as previously described with particular reference to Figs. 1 and 2.

In order to provide for occasions when the aid of the starting engine 9 is considered unnecessary, and in order to make it possible to obtain the benefit of the flywheel 16 without the attendant disadvantage of the drag of the engine crankshaft 12 and the clutch 57 on such occasions of non-use of the engine 9, a second means of operating the switch 134, 135 is provided, said second operating means being adapted to operate said switch 134, 135 independently of the flywheel actuating rock-shaft 98. As shown, in Figs. 2 and 3 this second means takes the form of an arm 160 projecting through an opening in the housing 99 of the switch and having operative connection directly with the disc 137, whereby movement of the arm will cause oscillation of said disc without any corresponding movement of the rock-shaft 98. In this manner the solenoid 104 may be energized to shift the member 26 into engine engaging position after suitable acceleration of the flywheel and without the necessity of connecting said flywheel with the member 57.

Other applications of the mechanism, together with changes in the form, details of construction and arrangement of parts will now be apparent to those skilled in the art, and may be made without departing from the spirit of the invention. Reference is therefore to be had to the appended claims for a definition of the limits of the invention.

This application is a division of my co-pending application No. 754,531 filed November 23, 1934, the said application having matured as Patent No. 2,095,236, granted October 12, 1937.

What is claimed is:

1. The combination with a pair of clutch elements to be driven, of a driving element independent of both said clutch elements, means for coupling said driving element to one of said clutch elements, and additional means for coupling said driving element to the other of said clutch elements, said last named means including a part operating within a predetermined time after and in response to the operation of said first named coupling means.

2. The combination with a pair of clutch elements, of a driving element independent of both said clutch elements, means for coupling said driving element to one of said clutch elements, additional means for coupling said driving element to the other of said clutch elements, said last named means including an electromagnetic device, a circuit controlling energization of said electromagnetic device, and means for closing said circuit within a predetermined time after the operation of said first named coupling means.

3. The combination with a pair of clutch elements, of a driving element independent of both said clutch elements, means for coupling said driving element to one of said clutch elements, additional means for coupling said driving element to the other of said clutch elements, said last named means including an electromagnetic device, a circuit controlling energization of said electromagnetic device, means for closing said circuit within a predetermined time after the operation of said first named coupling means, said circuit closing means including a normally closed switch, means responsive to operation of said first named coupling means to move said switch to the open position, and opposing means for thereafter returning said switch to the closed position.

4. The combination with a pair of clutch elements, of a driving element independent of both said clutch elements, means for coupling said driving element to one of said clutch elements, additional means for coupling said driving element to the other of said clutch elements, said last named means including an electromagnetic device, a circuit controlling energization of said electromagnetic device, means for closing said circuit within a predetermined time after the operation of said first named coupling means, said circuit closing means including a normally closed switch, means responsive to operation of said first named coupling means to move said switch to the open position, opposing means for thereafter returning said switch to the closed position, and dashpot means for retarding operation of said opposing means.

5. The combination with a pair of clutch elements having clutch engaging means associated therewith, of a second pair of clutch elements, and means including a part operating within a predetermined time after the operation of said engaging means for said first pair of clutch elements, to produce engagement of said second pair of clutch elements, said last named means including an electromagnetic device, a circuit controlling energization of said electromagnetic device, and means for closing said circuit within a predetermined time after the operation of said engaging means for said first pair of clutch elements.

6. The combination with a pair of clutch elements having clutch engaging means associated therewith, of a second pair of clutch elements, and means including a part operating within a predetermined time after the operation of said engaging means for said first pair of clutch elements, to produce engagement of said second pair of clutch elements, said last named means including an electromagnetic device, a circuit controlling energization of said electromagnetic device, means for closing said circuit within a predetermined time after the operation of said engaging means for said first pair of clutch elements, said circuit closing means including a normally closed switch, means responsive to operation of said engaging means to move said switch to the open position, and opposing means for thereafter returning said switch to the closed position.

7. The combination with a pair of clutch elements having clutch engaging means associated therewith, of a second pair of clutch elements, and means including a part operating within a predetermined time after the operation of said engaging means for said first pair of clutch elements, to produce engagement of said second pair of clutch elements, said last named means including an electromagnetic device, a circuit controlling energization of said electromagnetic device, means for closing said circuit within a predetermined time after the operation of said engaging means for said first pair of clutch elements, said circuit closing means including a normally closed switch, means responsive to operation of said engaging means to move said switch to the open position, opposing means for thereafter returning said switch to the closed position, and dashpot means for retarding operation of said opposing means.

HOWARD BAER.